US006795073B1

(12) United States Patent
Furukawa et al.

(10) Patent No.: US 6,795,073 B1
(45) Date of Patent: Sep. 21, 2004

(54) CHARACTER READING CIRCUIT

(75) Inventors: Riichi Furukawa, Gunma-ken (JP); Hiroyasu Shindo, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 262 days.

(21) Appl. No.: 09/672,594

(22) Filed: Sep. 28, 2000

(30) Foreign Application Priority Data

Sep. 30, 1999 (JP) .......................................... 11-278599

(51) Int. Cl.[7] ................................................ G06T 11/60

(52) U.S. Cl. ....................................... 345/467; 382/182

(58) Field of Search ................................ 345/467, 468, 345/469.1, 470, 471, 472, 472.1, 472.2, 472.3, 16, 17, 18, 26, 269.1, 441, 442, 551; 358/296, 1.16, 404, 444; 382/182–188, 208, 198, 199

(56) References Cited

U.S. PATENT DOCUMENTS

| | | | | | |
|---|---|---|---|---|---|
| 5,191,430 | A | * | 3/1993 | Sudoh et al. | 358/296 |
| 5,642,136 | A | * | 6/1997 | Jayavant et al. | 345/467 |
| 5,781,714 | A | * | 7/1998 | Collins et al. | 345/471 |
| 5,936,637 | A | * | 8/1999 | Seto | 345/468 |
| 6,011,561 | A | * | 1/2000 | Shigi et al. | 345/471 |
| 6,126,342 | A | * | 10/2000 | Kurumida | 400/76 |
| 6,249,273 | B1 | * | 6/2001 | Plog | 345/467 |
| 6,380,940 | B1 | * | 4/2002 | Halstead, Jr. et al. | 345/469.1 |
| 6,421,054 | B1 | * | 7/2002 | Hill et al. | 345/469 |
| 6,535,213 | B1 | * | 3/2003 | Ogino et al. | 345/442 |
| 6,542,157 | B1 | * | 4/2003 | Browne | 345/441 |
| 6,563,502 | B1 | * | 5/2003 | Dowling et al. | 345/469.1 |
| 6,597,360 | B1 | * | 7/2003 | Stamm et al. | 345/469 |

FOREIGN PATENT DOCUMENTS

| | | |
|---|---|---|
| JP | 9-212332 | 8/1997 |
| JP | 10-240222 | 9/1998 |

OTHER PUBLICATIONS

Mikelsons, Martin, "Prettyprinting in an interactive programming environment," Proceedings of the ACM SIGPLAN SIGOA symposium on Text Manipulation, 1981, pp. 108–116.*

* cited by examiner

*Primary Examiner*—Michael Razavi
*Assistant Examiner*—Thu-Thao Havan
(74) *Attorney, Agent, or Firm*—Hogan & Hartson, LLP

(57) ABSTRACT

When a character is present in a line adjacent to a concerned section, bordering is applied to a dot in the concerned section adjacent to that line. To avoid unnecessary bordering, when processing a head line of the concerned part, data on the head line is read instead of the data on a line above the head line. Alternatively, data on a line above the head line is all changed to background data. A last display line is similarly processed.

2 Claims, 5 Drawing Sheets

CHARACTER READING CIRCUIT

BACKGROUND OF THE INVENTION

1. Field of the Invention

The present invention relates to a character reading circuit for accessing a character area for storing characters, such as letters or the like, to read character data for displaying a character on a display such as a television screen, and in particular to a character reading circuit capable of partial reading from a character area.

2. Description of the Related Art

A known conventional TV equipment allows display of RGB processed color characters on a TV screen according to predetermined code data, the code data being reproduced from a received signal or generated internally.

For character display, a character ROM and a video RAM are provided to such equipment. A character ROM stores dot patterns (character patterns) of predetermined character fonts, and a video RAM stores character codes for specifying an access address in the character ROM. Addresses of the video RAM correspond to character display positions on a TV screen. Therefore, characters are displayed through reading corresponding character patterns from the character ROM according to character codes stored at the respective locations in the video RAM.

Here, a character area in the character ROM for storing each character, is addressed by a character code stored in the video RAM and has a constant size. Meanwhile, each character may be displayed on a screen in one or more of a variety of sizes, including large and small character sizes. Storing a single small character in a character area with the capacity to store a larger character is an inefficient use of memory space. In light of this, a circuit capable of partial reading from a character area is proposed in Japanese Patent Laid-open publication No. Hei 9-212332. With this circuit, two or more characters can be stored in one character area, and each of the characters stored in one character area can be separately read out therefrom. This allows efficient utilization of ROM capacity.

Also, when a character is displayed in a color overly similar to that of the background, the character can may be recognizable, or may be difficult to recognize. To address this problem, each character may be bordered for clarification. That is, bordering a character in a color different from that of the character creates easily recognizable characters. In addition,"bordering" may be called as"fringe".

As a bordering algorithm, when a dot to be processed (an object dot) is a background dot and at least one of the dots above, below, to the left, or to the right side of the object dot is a foreground dot (a dot for character displaying), the object dot is bordered. That is, the object dot is set in a bordering color which is different from the color of an associated character. Such bordering processing can be efficiently achieved using a circuit such as is disclosed in Japanese Patent Laid-open No. Hei 10-240222. With the disclosed circuit, data for three rows can be read in parallel, and bordering processing can be performed based on that data.

This circuit, however, has a problem in that inappropriate bordering may be made when data is read through partial reading from a desired character area. That is, for bordering with respect to the head or end line of a partially read section, data on lines above and below the partially read section is also read, similar to bordering with respect to other lines, to be subjected to bordering processing. Therefore, the bordering processing is affected by data for a section (out-part data) adjacent to the partial reading section. As out-part data is not displayed, bordering based on the out-part character data should be avoided.

To prevent undesirable influence of this type, in one possible method, character data is prevented from being written in a line adjacent to the boundary of a partial reading part within one character area. However, maintaining a line of character dots which are never used wastes capacity of the character area.

SUMMARY OF THE INVENTION

The present invention aims to provide a character reading circuit capable of partial reading of character data without adversely effecting bordering processing.

According to the present invention, in a character reading circuit capable of reading character font data through partial reading from one character area designated by one character code, modification of data stored in the section to be partially read (in-part data) based on data stored in a section adjacent to the partially read section (out-part data) is prohibited.

Here, when a character area is divided into partial reading sections and bordering processing is applied, when character data not to be read is located adjacent to a section storing data for reading, bordering will be made only within the concerned part. An arrangement of the present invention can prevent unnecessary data modification by prohibiting data modification.

In addition, preferably, in-part data may be read in the place of out-part data for use in modification of the in-part data. With this arrangement, out-part data is not read, and bordering based on out-part character data can be prevented.

In this case, when reading character font data, data on lines above and below a data reading line is read together with data on the data reading line so that data on the data reading line is modified based on data read for these three lines. In addition, with respect to the partial reading part, preferably, data on the head line of the partially read part is read twice and data on a line below the head line is read once when reading data on the head line of the partial reading part, and data on the last line is read twice and data on a line above the last line is read once in reading data for the last line of the partial reading part.

Further, preferably, the out-part data read for use in modification of the in-part data is changed into background data. With this arrangement, the out-part data contains no character data, so that bordering processing based on out-part character data can be prevented.

In such a case, when reading character font data, data on lines above and below a data reading line is read together with data on the data reading line so that data on the data reading line is modified based on the data read for these three lines. In addition, with respect to the partial reading part, data on a line above the head line is fixed as background data in reading data on the head line of the partial reading part, and data on a line below the last line is fixed as background data in reading data on the last line of the partial reading part.

Still further, a preferable modification of the in-part data is bordering of a character.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

In the following, a preferred embodiment of the present invention (hereinafter referred to as an embodiment) will be described, referring to the accompanying drawings.

Figure 1:
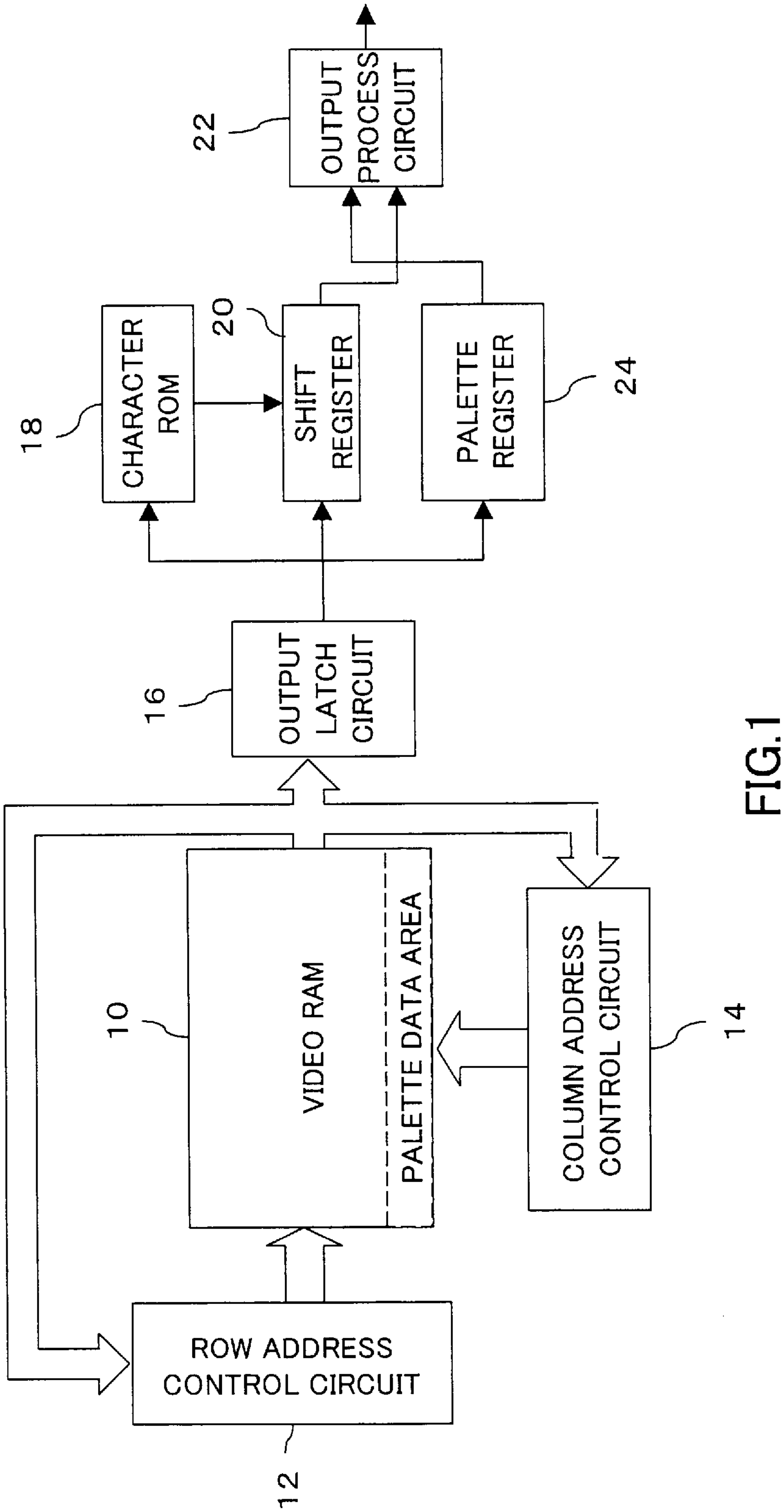
FIG. 1 is a diagram showing a complete circuit structure according to a preferred embodiment of the present invention.

FIG. 1 is a block diagram showing a complete structure of a character display control circuit, which may be achieved using a microcomputer. Note that the basic structure of the circuit is similar to that which is disclosed in Japanese Patent Laid-open No. Hei 10-240222, and detailed description thereof is incorporated herein by reference.

A video RAM 10 stores character codes corresponding to display characters, at addresses corresponding to display positions on a television screen. Alternatively, when attribute information, indicative of character displaying colors, must be stored, the video RAM 10 stores attribute codes which designate attribute information, instead of character codes.

In this embodiment, one of the three colors (a character color, a background color, and a border color) is selected for each dot in a border mode. Among these available colors, each color is changed in response to an attribute code. Multiple color display using four colors may, of course, be employed when preferred.

As indicated by the broken line separating the video RAM 10 in FIG. 1, the video RAM 10 incorporates a palette data area for storing palette data. A palette data area stores data for specifying attributes of characters (display characters), background, and borders. That is, the palette data area is accessed, using an attribute code read from the video RAM 10, as address data, for specifying attributes of display characters.

Here, an area with small row addresses in the video RAM 10 is ensured for storing initial setting data. The area is designated by seventeen row addresses“00 to 10”H in the vertical direction and thirty-two column addresses“00 to 0F”H in the horizontal direction. Further, in an area with row addresses “00 to 0F”H and column addresses “00 to 08”H, initial setting data, such as data on a character display start position on a TV screen, attributes of a character to be initially displayed on a TV screen, and data on a display mode for that character, is stored. Here,“a display mode”, means a mode specifying whether to display a character in four colors or being bordered. In addition, in an area with row addresses“00 to 0F” H and column addresses“09 to 1F”H, character codes (or attribute codes) are stored corresponding to character display positions on a TV screen.

At column address“00”H in the initial setting data storing area, data on a vertical display start position for a character in the present row (a horizontal scanning line number indicative of a character display line on a screen) is stored. At column addresses“01”H, data “M”, indicative of a display start position (line) within one character area, is stored. At column addresses “02”H, data“N”, relative of a line next to a display end position (line) within one character area, is stored. At column addresses “04”H, data relative to a display start position for the initial character in one horizontal line (the number of dot clocks DCLK from the rise of a horizontal synchronous signal Hs (end of a horizontal return period) to character display start) is stored. It should be noted that a character is displayed in between the $M^{th}$ horizontal line to the $(N\text{-}1)^{th}$ horizontal line.

The video RAM 10 is connected to a row address control circuit 12 and a column address control circuit 14. The row address control circuit 12 outputs a reading row address in the video RAM 10, based on a vertical synchronous signal VS and a horizontal synchronous signal HS. The row address control circuit 12 also outputs a signal ROWSTART notifying display start when it has counted horizontal synchronous signals from the beginning of a screen to a head character display line. The column address control circuit 14 outputs a reading column address in the video RAM 10, based on a horizontal synchronous signal and a dot clock DCLK, which corresponds to each character display dot. The column address control circuit 14 also outputs a signal HSTART notifying character display start when it has counted dot clocks to a character display start position in a horizontal line.

The video RAM 10 is also connected to an output latch circuit 16 for latching a character code, an attribute code, and palette data from the video RAM 10. The output latch circuit 16 is also connected to the character ROM 18, which supplies a character pattern stored therein at an address specified by a character code, to an output process circuit 22 via a shift register 20. The shift register 20 sequentially forwards character patterns based on a dot clock DCLK.

An attribute code, latched and held in the output latch circuit 16, is supplied to the column address control circuit 14, which then specifies a palette address, based on the supplied attribute code. With this, palette data is read from the specified palette address in the video RAM 10, and held in the output latch circuit 16.

The palette data, latched and held in the output latch circuit 16, is supplied to a palette register 24 to be stored therein. In this embodiment, at least three types of palette data (for a character, background, a border) are to be stored in the palette register 24 (four types are to be stored when multiple color display is applied), and then supplied to the output process circuit 22. Palette data is RGR luminous data, and data on each color has two bits in this embodiment. Therefore, at least three types of palette data each having six bits (RGB) are supplied to the output process circuit 22.

In this embodiment, character data for three lines are sequentially read from the character ROM 18, and stored in the shift register 20. The shift register 20 then outputs in parallel the character data for all three lines to the output process circuit 22.

Through execution using the supplied character data for three lines, the output process circuit 22 determines whether an object dot is a character dot, a background dot, or a border dot. That is, character data is data indicating whether a concerned dot is a character dot or a background dot. Referring to the character data, the output process circuit 22 determines whether the object dot is a character dot, a background dot, or a border dot. Specifically, the circuit 22 determines that the object dot is a character dot upon receipt of character data indicating a character dot. Upon receipt of character data indicating background, on the other hand, the circuit 22 further investigates whether the object dot is a background dot or a border dot. Specifically, when a character dot is present either above, below, on the right or left side of the object dot, the circuit 22 determines that the object dot is a border dot. When a character dot is absent, the circuit 22 determines that the object dot is a background dot.

Figure 2:
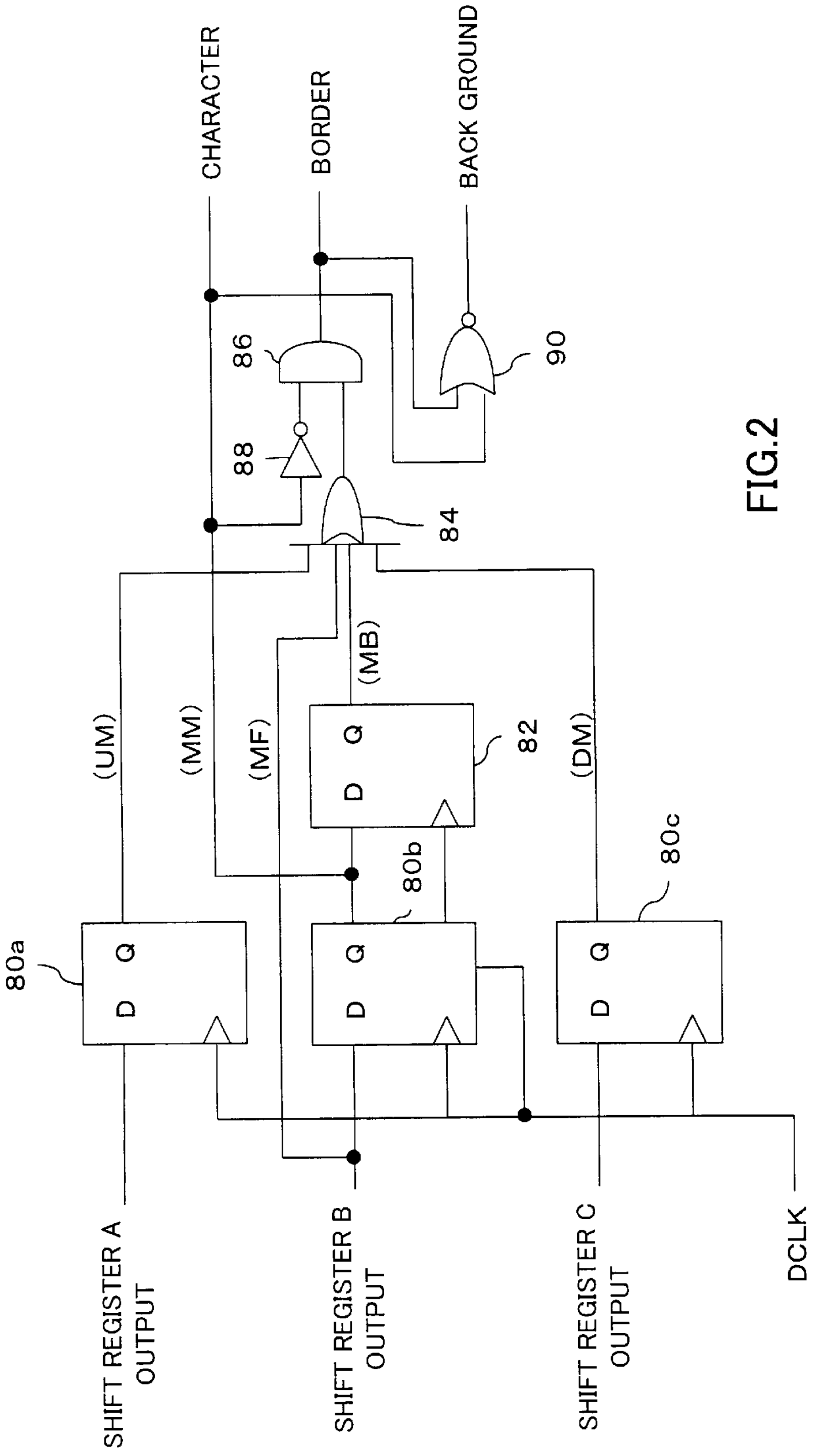
FIG. 2 is a diagram showing a circuit for bordering.

FIG. 2 shows a specific example of a circuit for carrying out the above described determination. As shown, the shift register 20 outputs character data for three lines in parallel via shift registers A (above), B (middle), and C (below) to respective flip flops 80*a*, 80*b*, and 80*c*. The flip flops 80*a*, 80*b*, 80*c*, upon receiving dot clocks DCLK at their clock terminals, forward the outputs of the shift register 20 at a timing delayed by one clock. In particular, an output of the flip flop 80*b* is input to the data terminal of a flip flop 82, which, receiving a dot clock CDLK at a clock terminal thereof, in turn outputs data at timing delayed by two clocks.

With an output from the flip flop 80*b* being character data MM for an object dot, data on the input line to the flip flop 80*b* is character data MF for a dot immediately following the object dot, and data on an output from the flip flop 82 is character data MB on a dot preceding the object dot by one dot. Meanwhile, the flip flop 80*a* outputs character data UM for a dot above the object dot, while the flip flop 80*c* outputs character data DM on a dot below the object dot. Consequently, character data for the object dot and for four dots above, below, on the right and left sides of the object dot, can be obtained.

Data MM for the object dot is output intact as a character signal. Data for the four dots around the object dot (character data UM, MF, MB, DM) is input to the OR gate 84. The OR gate 84 outputs a signal H to an AND gate 86 when data for at least one of the four dots has a value of 1(H). Here, the AND gate 86 also receives, at the other input terminal thereof, data obtained by inverting the data MM by an inverter 88. Therefore, the AND gate 86 outputs a signal H only when data for the object dot is 0(L) and data on at least one of the surrounding dots is 1(H). An output of the AND gate 86 is a border signal, which rises to a H level only when the object dot is a border dot. Further, a character signal and a border signal are supplied to a NOR gate 90. The NOR gate 90 outputs a signal H only when the character signal and the border signal are both at an L level. An output of the NOR gate 90 is a background signal, which rises to an H level when the object dot is a background dot. Once a character signal, a border signal, and a background signal have all been obtained, it is known which data should be selected from the three types of palette data (character, border, and background) supplied from the palette data register 24, depending on which of the three signals is at an H level. This selection can be easily made by inputting three types of palette data, a character signal, a border signal, and a background signal to three, respective AND gates.

Address control in reading character data from the character ROM 18 will next be described. A character data reading address is specified according to a character code, read from the video RAM 10 and stored in the output latch circuit 16. Here, a character code specifies one character area which usually stores one character. A vertical position within one character area is specified according to the result of counting of horizontal synchronous signals, by the row address control circuit 12.

Character data is read for three lines in parallel and held in the shift register 20. For this purpose, an addition subtraction circuit is provided for adding (+1), (−1), and (0) to an address during a period with character data being read from the character ROM 18, so that character data at the resultant addresses are sequentially read to be supplied to the shift register 20 via the output latch circuit 16. The addition subtraction circuit, having (−1) and (+1) terminals, outputs an address on a line above the object line when the (−1), (+1) terminals have signals H and L, respectively. Similarly, an address on a line below the object line is output in response to signals L and H at these terminals, respectively, and an address on the object line is output intact in response to signals L, L at these terminals, respectively.

Figure 3:
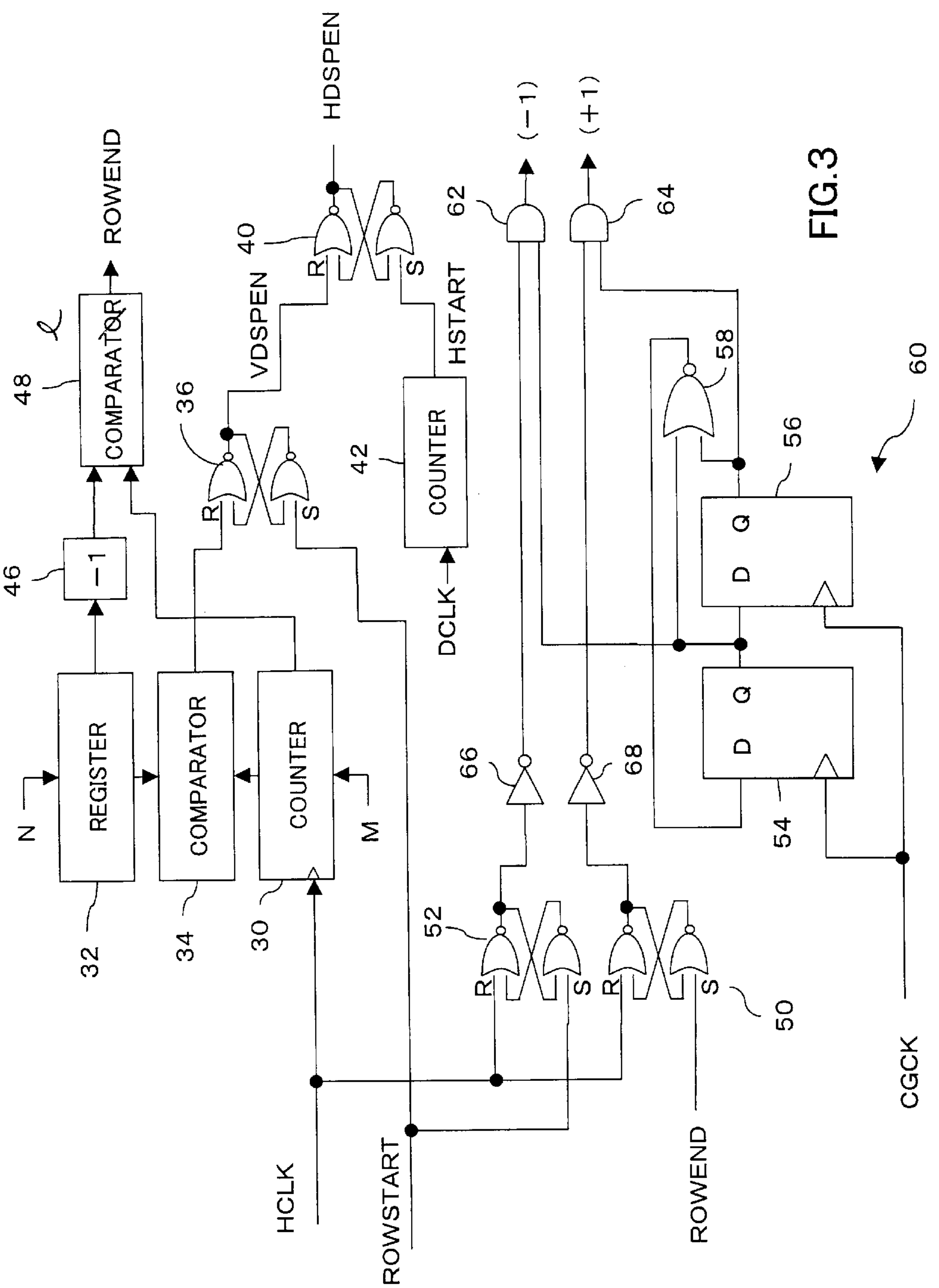
FIG. 3 is a diagram showing a circuit for controlling a reading address of a character ROM.

In this embodiment, in particular, a desired section (between M line and N−1 line) in one character area is cut off from the rest for reading. This can be achieved by a circuit such as that which is described below referring to FIG. 3.

The row address control circuit 12 incorporates a counter for counting horizontal synchronous signals to output a row address, so that data is read from the video RAM 10 based on the output row address. Then, data on a head display line, stored in the video RAM 10 as initial setting data, is compared with a horizontal line value shown at the counter, and, when these data values coincide with each other, a signal ROWSTART, indicative of a head character display line, is output as an H pulse. Further, initial setting data M, indicative of a display start position within one character area, is set to the counter 30, and data N, indicative of a position next to a display end position within one character, is set to the register 32. The counter 30 thereafter counts an HCLK pulse, which corresponds to the rise of a horizontal synchronous signal, to be counted up.

Outputs of the counter 30 and the register 32 are supplied to a comparator 34 which verifies whether these outputs coincide with each other. When they do, the comparator 34 outputs an output H to a reset terminal of a latch circuit 36. The latch circuit 36, receiving also a signal ROWSTART via a set terminal thereof, continuously outputs a signal at H level during a period from the rise of a signal ROWSTART to an H level to the rise of an output of the comparator 34 to an H level. That is, an output of the latch circuit 36, or VDSPEN, remains at an H level during a character displaying period.

An output VDSPEN is supplied, via the inverter 38, to the reset terminal of the latch circuit 40. The latch circuit 40 therefore remains in a reset state during a period other than a vertical period with a character being displayed. The latch circuit 40 also receives at a reset terminal thereof a horizontal synchronous signal HS, which remains at an H level only during a horizontal return period. Therefore, the latch circuit 40 remains in a reset state during a horizontal return period.

The latch circuit 40 further receives, at a set terminal thereof, an output of the counter 42, or a signal HSTART. Here, the counter 42 is set with data obtained by inverting data indicative of a display start position for an initial character in one horizontal line (the number of dot clocks DCLK issued during a period from the rise of a horizontal synchronous signal HS to the character display start), and counts dot clocks DCLK. Therefore, the counter 42 is counted up when it has counted clocks DCLK to a horizontal character display start position, and then outputs a pulse HSTART.

Therefore, an output of the latch circuit 40, or a signal HDSPEN, is repeatedly set in response to a pulse HSTART during a vertical period with a character being displayed, and reset during a horizontal return period. That is, the signal HDSPEN indicates a character displaying period. In other words, character data is read from the character ROM 18 during a period with a signal HDSPEND remaining at an H level.

An output of the register 32 is input to a −1 circuit 46 for subtraction by one, and then to a comparator 48. The comparator 48, which also receives at the other terminal thereof an output of the counter 30, outputs a coincidence signal ROWEND when a vertical display position comes to be in an N−1 line (a last display line).

The signal ROWEND is input to the set input terminal of a latch circuit 50, which also receives, at a reset terminal thereof, a signal HCLD, which has an H pulse signal at the beginning of a horizontal return period. Therefore, the latch circuit 50 outputs a signal H in the last display line where a coincidence signal ROWEND rises to an H level, and a signal L at the beginning of the following line.

A signal ROWSTART, indicative of the head character display line, is input to the set input terminal of the latch circuit 52, which also receives, at a reset terminal thereof, a signal HCLK. Therefore, the latch circuit 52 outputs a signal H at a head display line, where a signal ROWSTART rises to an H level, and a signal L at the beginning of the next line.

A ternary counter 60, comprising flip flops 54, 56 and a NOR gate 58, is provided for counting a character reading clock CGCK. In the ternary counter 60, the flip flops 54, 56 repeatedly store and output data "0, 0", "1, 0", and "0, 1" according to a clock CGCK, wherein"0" indicates an L level, and"1" indicates an H level. It should be noted that CGCK is a clock having a cycle of, for example, ⅛ of a period for reading one character area.

Each of the outputs of the flip flops 54, 56 is supplied to one respective end of the AND gates 62, 64. The AND gate 62 also receives, at the other terminal thereof, an output of the latch circuit 52 via an inverter 66. The AND gate 64 also receives, at the other terminal thereof, an output of the latch circuit 50 via an inverter 68.

With an output of the latch circuit 52 being inverted, the signal becomes L level only during a horizontal period of a head character display line. Therefore, the AND gate 62 forwards an output of the flip flop 54 intact with respect to lines other than a head character display line, and issues an output remaining at L level with respect to a head character display line. With an output of the latch circuit 50 being inverted, the signal becomes L level during a horizontal period of the last character display line. Therefore, the AND gate 64 forwards an output of the flip flop 56 intact with respect to lines other than the last character display line, and issues an output remaining at an L level with respect to a last character display line.

An output of the AND gate 62 is supplied to a (−1) terminal of an addition subtraction circuit for adding (+1), (−1), or (0) to a reading address of the character ROM 18. An output of the AND gate 64 is supplied to the (+1) terminal of the addition and subtraction circuit for adding (+1), (−1), and (0) to a reading address of the character ROM 18. With the above, the addition and subtraction circuit is supplied, at the (−1) and (+1) input terminals thereof, with signals which repeatedly become at"L, L", "L, L", and"L, H" levels, respectively, with respect to a head display line, "L, L", "H, L", and"L, L" levels with respect to a last display line, and "L, L", "H, L", and"L, H" levels with respect to other character display line. As a result,"middle, middle, below" addresses are repeatedly designated as reading addresses in the character ROM 18 with respect to a head display line,"middle, above, middle" addresses are designated with respect to a last display line, and"middle, above, below" addresses are designated with respect to other lines.

Figure 4:
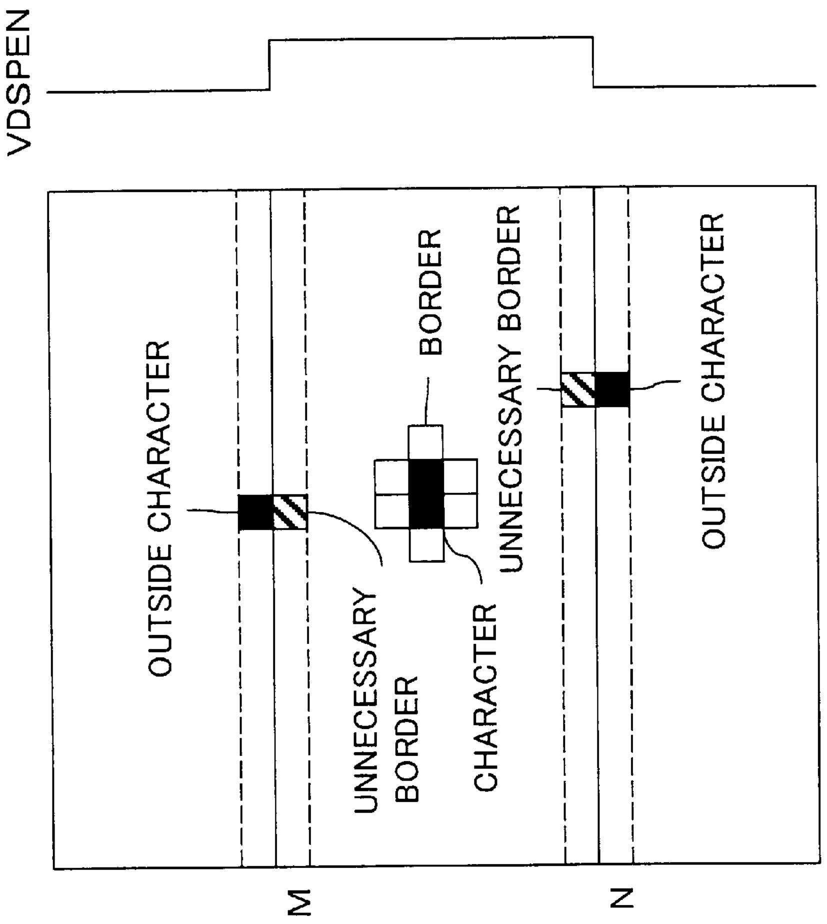
FIG. 4 is a diagram showing bordering.

With the above arrangement, when displaying character data stored in a section between the M line and the (N−1) line in a character area in the character ROM 18, the displaying is not affected by the out-part data. That is, unnecessary bordering can be avoided. In other words, bordering based on the out-part data stored in the hatched part in FIG. 4 can be prevented within the concerned section.

In the above embodiment, a reading address is modified such that out-part data is not read when reading data for the head or last display line. Alternatively, data may be read according to an unmodified reading address, and subsequent bordering based on out-part data may be prohibited.

Figure 5:
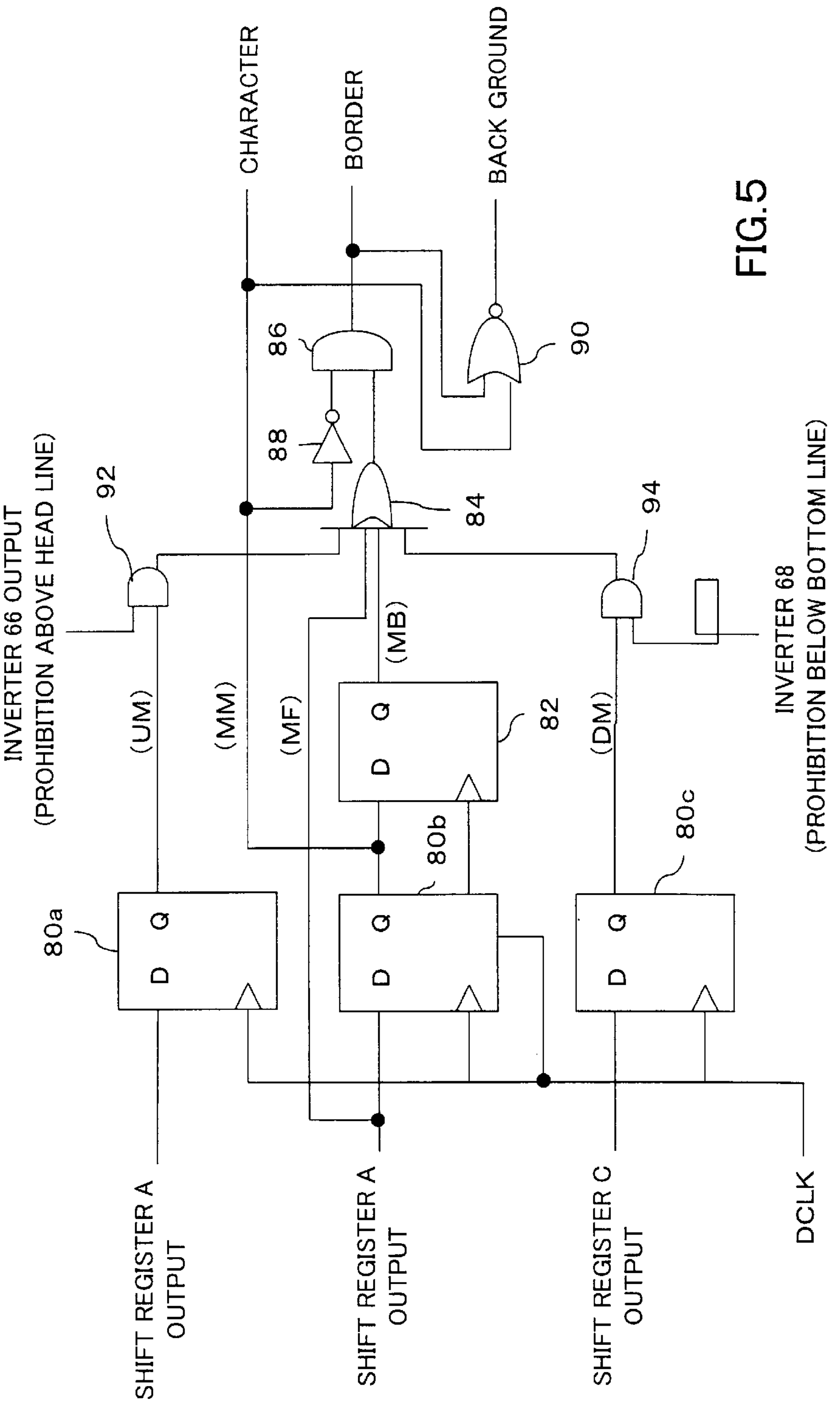
FIG. 5 is a diagram showing another example circuit for bordering.

Specifically, as shown in FIG. 5, an AND gate 92 is provided on a line relative to an above line reading character data UM, for receiving an output from the inverter 66. With the above, above line character data remains at an L level with respect to a head display line. That is, data on the above line (character data) is fixed at background data. In addition, an AND gate 94 is provided on a line for a below line reading character data DM, for receiving an output from the inverter 68. With the above, below line character data remains at an L level with respect to a last display line. That is, data on a below line is fixed at background data. As a result, bordering based on out-part data can be prohibited for concerned character data being read out.

As described above, in this embodiment, when a character area is divided for partial reading, modification of in-part data based on out-part data is prohibited. As a result, even when character data not for reading is stored in a section (out-part) adjacent to a section (in-part) storing character data for reading, the in-part data can be protected from subjection to bordering based on the out-part data.

What is claimed is:

1. A character reading circuit for reading character font data in one character area designated by one character code, wherein, the circuit prohibits, when data stored in a predetermined section of the character area is read through partial reading as in-part data, modification of the in-part data based on out-part data which is stored in a section adjacent to the predetermined section for partial reading, modification of the in-part data is prohibited by reading in-part data instead of out-part data for use in modification of the in-part data, when character font data is read, data on lines above and below a data reading line is read together with data on the data reading line so that data on the data reading line is modified based on the data on the data reading line and the lines above and below the data reading line, and with respect to the predetermined section for partial reading, when reading data on a head line of the predetermined section, data on the head line is read twice and data on a line below the head line is read once, and when reading data on a last line of the predetermined part, data on the last line is read twice and data on a line above the last line is read once.

2. A character reading circuit for reading character font data in one character area designated by one character code, wherein, the circuit prohibits, when data stored in a predetermined section of the character area is read through partial reading as in-part data, modification of the in-part data based on out-part data which is stored in a section adjacent to the predetermined section for partial reading, modification of the in-part data is prohibited by changing into background data the out-part data read for use in modification of the in-part data, when character font data is read, data on lines above and below a data reading line is read together with data on the data reading line so that data on the data reading line is modified based on the data on the data reading line and the lines above and below the data reading line, and with respect to the predetermined part for partial reading, when reading data on a head line of the predetermined part, data on a line above the head line is fixed as a background data, and when reading data on a last line of the predetermined part, data on a line below the last line is fixed as background data.

* * * * *